United States Patent [19]

Matsuzaki

[11] Patent Number: 5,000,786

[45] Date of Patent: Mar. 19, 1991

[54] INK COMPOSITION AND INK JET RECORDING APPARATUS AND METHOD

[75] Inventor: Makoto Matsuzaki, Nagano, Japan

[73] Assignee: Seiko Epson Corporation, Tokyo, Japan

[21] Appl. No.: 264,711

[22] Filed: Oct. 31, 1988

[30] Foreign Application Priority Data

| Nov. 2, 1987 | [JP] | Japan | 62-277710 |
| Mar. 1, 1988 | [JP] | Japan | 63-47989 |
| Apr. 28, 1988 | [JP] | Japan | 63-106065 |
| Sep. 27, 1988 | [JP] | Japan | 63-241619 |

[51] Int. Cl.$^5$ ............................................. C09D 11/06
[52] U.S. Cl. ........................................ 106/27; 106/20; 106/22
[58] Field of Search ........................... 106/22, 27, 20

[56] References Cited

U.S. PATENT DOCUMENTS

| 3,375,120 | 3/1968 | Remer | 106/268 |
| 3,653,932 | 8/1969 | Berry et al. | 106/22 |
| 3,715,219 | 9/1969 | Kurz et al. | 106/272 |
| 3,850,648 | 11/1974 | Riedel et al. | 106/31 |
| 4,072,959 | 4/1976 | Elmqvist | 346/140 |
| 4,390,369 | 12/1981 | Merritt et al. | 106/31 |
| 4,409,601 | 3/1982 | Nilsson et al. | 346/140 |
| 4,409,602 | 3/1982 | Bolmgren et al. | 346/140 |
| 4,438,441 | 3/1982 | Bolmgren et al. | 346/140 |
| 4,484,948 | 6/1983 | Merritt et al. | 106/31 |
| 4,539,575 | 5/1984 | Nilsson | 346/140 |
| 4,564,851 | 2/1984 | Nilsson et al. | 346/140 R |
| 4,659,383 | 8/1984 | Lin et al. | 106/27 |
| 4,808,227 | 2/1989 | Yuasa et al. | 106/31 |
| 4,878,946 | 11/1989 | Tabayashi et al. | 106/27 |

FOREIGN PATENT DOCUMENTS

| 0099682 | 7/1983 | European Pat. Off. . | |
| 0176228 | 8/1985 | European Pat. Off. . | |
| 176228 | 4/1986 | European Pat. Off. | 106/22 |
| 43-27599 | 11/1968 | Japan . | |
| 55-54368 | 4/1980 | Japan . | |
| 56-113462 | 9/1981 | Japan . | |
| 56-113472 | 9/1981 | Japan . | |

*Primary Examiner*—William R. Dixon, Jr.
*Assistant Examiner*—Anthony J. Green
*Attorney, Agent, or Firm*—Blum Kaplan

[57] ABSTRACT

An ink composition particularly well suited for use in an ink on demand ink jet printer includes a first component, second component having a higher melting point than the first component and and colorant is provided. During printing, the ink is melted and jetted onto a recording medium. The first component is selected to permeate from the melted dot of ink into the recording medium. As its concentration in the dot of ink decreases and the temperature of ink cools, the second component with the colorant will solidify and the first component will fix the second component and colorant to the recording medium.

36 Claims, 4 Drawing Sheets

INK COMPOSITION AND INK JET RECORDING APPARATUS AND METHOD

BACKGROUND OF THE INVENTION

The invention relates generally to an ink composition and more particularly to an ink composition which is solid or semi-solid at ambient temperature and jetted in a liquid state at elevated temperatures, the recording apparatus and method using them.

Ink jet recording is superior to other recording methods because it is quiet and can print at high speed. Conventional ink compositions for ink jet recording include water based compositions. Recording is accomplished by allowing the ink to permeate into the recording paper. Unfortunately, the ink drop tends to blot as it permeates fully into the paper. Therefore, the edges of a recorded dot of ink is unclear and printing quality deteriorates.

Printing with water based ink compositions has other drawbacks. The print quality is affected by the type of recording paper being utilized so that the quality of printing from a particular recording apparatus can vary from poor to excellent depending on the type of paper on which printing occurs. In addition, conventional methods using water based liquid ink have not solved problems involving inadequately slow ink drying times. No prior art method has supplied consistent high print quality with fast drying times.

Liquid inks cause other problems relating to mechanical inadequacies of recording apparatuses. A low viscosity water based ink is normally stored in an ink tank and supplied through a tube to a print head which scans across the recording paper. The tube must have good flexibility and strength. Space within the recording apparatus must be reserved for tube movement. Leaks can develop within the supply system which is undesirable. When the ink supply tank is stored in the printing head, its rapid movement can form fine air bubbles within the ink which can cause problems such as cavitation within the ink head. Additionally, when an ink tank is replaced, ink tends to leak from the ink tank junction, and other areas, which can stain a users hands or clothing.

Ink jet recording methods for eliminating defects in water based inks are disclosed in U.S. Pat. Nos. 3,653,932, 3,715,219, 4,390,369, 4,484,948 and 4,659,383 as well as Japanese laid open application nos. 55-54,368, 56-113,462 56-113,472 and 58-108,271. To print pursuant to the method described, a hot-melt ink composition which is solid at room temperature is heated so that it melts and the melted ink is propelled onto the recording paper. The ink then solidifies on the surface of the paper as it cools, to form a recorded dot.

When printing with a hot-melt ink composition, the print quality does not vary as much with paper type. However, hot-melt printing has disadvantages because ink dots protrude from the surface of the recording paper. Friction, heat or pressure can peel the ink off the recording paper and the ink will often stick to objects that contact the paper. Some of these problems have been solved by fixing the hot-melt ink to the recording paper with a reheating step heat which can be accompanied by pressure. However, the hot-melt ink tends to blot as the ink is dispersed into the recording medium during remelting.

Accordingly, it is desirable to develop an improved ink composition for ink jet printing and a recording apparatus and method which avoids these shortcomings of the prior art.

SUMMARY OF THE INVENTION

Generally speaking, in accordance with the invention, an ink composition and printing apparatus are provided in which the ink includes two components having different melting points so that a first component will permeate into a recording medium and the second component which includes the colorant will yield a clear, well defined dot of ink. The first component will fix the second component which contains the colorant to the recording medium without blotting because it contains no colorant.

The ink composition is jetted from the recording apparatus in a liquid state at an elevated temperature. When the first and second components are both in the liquid phase, the two components exist in a uniform liquid state. The first component which does not contain colorant permeates the recording paper to fix the second component, which contains colorant, thereto. As the concentration of the first component within the dot of ink decreases and the dot cools, the second component, containing the colorant hardens in a well defined shape and the first component fixes the second component to the recording paper.

An ink jet recording apparatus in accordance with the invention includes an ink storage member, a heater for heating the ink composition and an ink jet member for jetting the heated ink composition onto the recording medium.

Accordingly, it is an object of the invention to provide an improved ink composition capable of producing clear, well defined dots of ink.

Another object of the invention is to provide an improved ink composition which yields high quality printing on different types and qualities of paper.

A further of object of the invention is to provide an ink composition which adheres well to recording paper.

Still a further object of the invention is to provide an improved ink composition which will adhere well to recording paper without an additional setting step.

Yet another object of the invention is to provide an ink jet recording apparatus which the ink does not leak and in which it is easy to replace the ink.

Yet a further object of the invention is to provide an ink jet printing apparatus in which there are no problems caused by air bubbles forming within the ink as the print head scans across the recording medium.

Still other objects and advantages of the invention will in part be obvious and will in part be apparent from the specifications and drawings.

The invention accordingly comprises the several steps and the relation of one or more of such steps with respect to each of the others, the apparatus embodying features of construction, combinations of elements and arrangement of parts which are adapted to effect such steps, and the ink composition which possesses the characteristics, properties, and relation of constituents, all as exemplified in the detailed disclosure hereinafter set forth, and the scope of the invention will be indicated in the claims.

BRIEF DESCRIPTION OF THE DRAWINGS

For a fuller understanding of the invention, references is had to the following description taken in connection with the accompanying drawings, in which.

DESCRIPTION OF THE PREFERRED EMBODIMENTS

Figure 1:
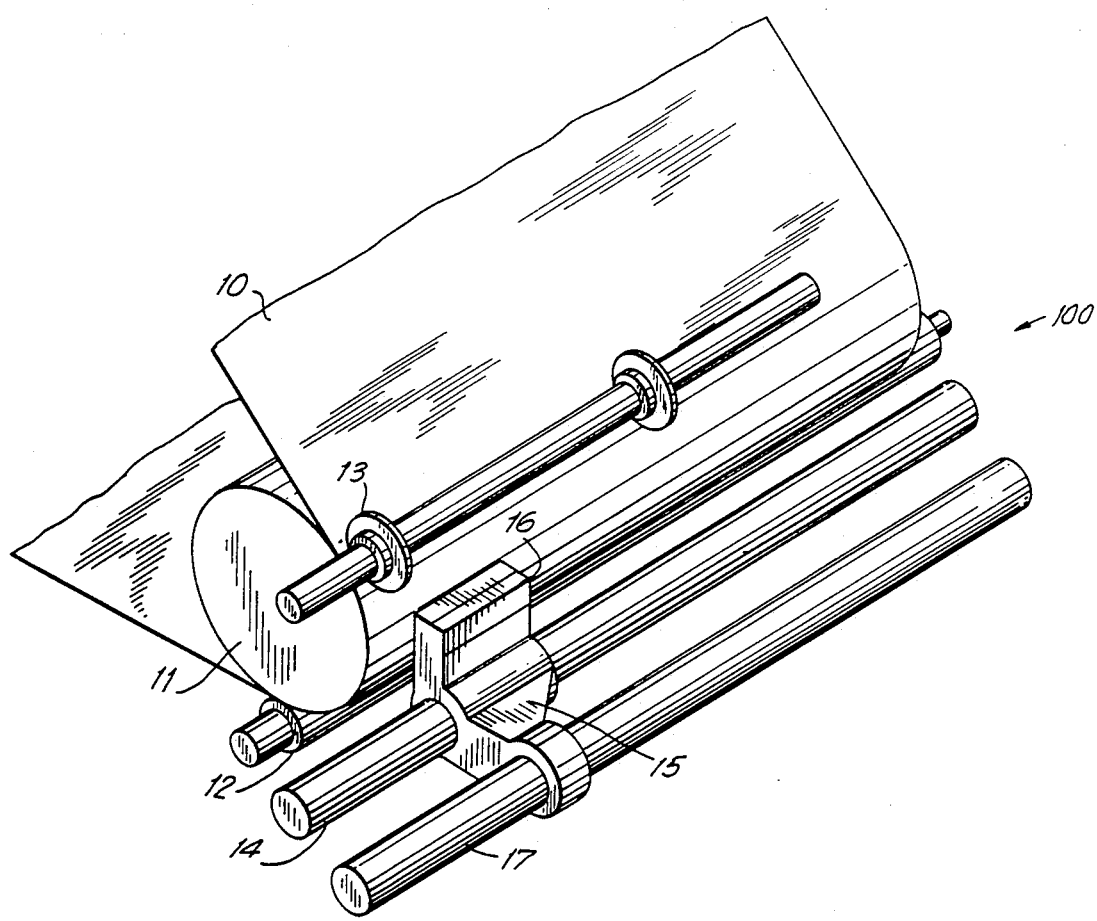
FIG. 1 is a perspective view of an ink jet recording apparatus constructed in accordance with the invention.

An ink composition prepared in accordance with the invention is propelled in a melted, liquid state onto a recording paper. The ink composition is solid or semi-solid at ambient temperatures and includes a first component and a second component having different melting points and a coloring material. In the case of the semi-solid ink composition, after the melted ink contacts the recording paper, the first component permeates into the recording paper and the second component, containing all of the colorant, remains on the surface of recording paper and maintains the colorant in a well defined shape. When a solid ink composition is used, a dot of melted ink is jetted onto the recording paper and heat and/or pressure is applied thereto. The first component permeates into the recording medium and the second component, containing the colorant remains on the surface of the recording paper.

The first component of the ink composition is useful for securing the dot of ink to the recording paper. The first component permeates into the recording medium and fixes the second component, which contains the colorant to the recording medium as a well shaped clearly defined dot of ink without blotting.

To propel a dot of ink from a recording apparatus onto a recording medium, the recording apparatus heats the ink to melt it. When the ink is heated to a temperature above the melting point of the second component, the coloring material, first component and second component form a uniform liquid phase. The melting point of the first component is lower than the melting point of the second component and the first component and coloring material will not dissolve until the second component is melted. Because the colorant will not dissolve in the first component, the colorant will not take a blotted form as the first component permeates into the recording medium.

Accordingly, an ink jet recording apparatus in accordance with the invention includes a heater to heat the ink to a temperature at which the second component will melt and the ink will dissolve to a uniform single liquid phase. The apparatus will also include a jetting mechanism for propelling ink to recording paper.

Selecting proper weight ratios among the ink composition components is beneficial for improving the quality of the resulting ink. The weight percent of the first component is designated E1, the weight percent of the second component is designated E2 and the weight percent of the remaining components is designated as E3. The ratio of E1 to E2 should preferably be in the range of about 50:1 and 1:10. If the ink composition is a solid ink, the ratio of the first component to the second component is preferably between about 20:1 and 1:2 and more preferably between about 10:1 and 1:1. If the ink composition is a semi-solid ink having a high viscosity, such as an ink having the consistency of paste or grease, the ratio of the first component to the second component is preferably between about 30:1 and 1:2 and more preferably between about 10:1 and 1:1. These ratios are desirable for insuring proper permeation of the first component into the recording medium and to prevent clogging of the ink jet nozzle.

If the ink composition is formed outside of these ratios, certain problems can develop. If the ratio of the first component to the second component is greater than about 50:1, the solubility of the colorant in a melted dot of ink can be reduced. The ink will not dissolve into a single liquid state at high temperatures, but remain as a precipitate. This can cause clogging of the nozzles of the ink jet head. If the ratio of the first component to the second component is less than about 1:10, the influence of the high melting point second component will prevent proper permeation of the first component into the recording medium and the ink dot will not be properly fixed to the recording medium.

Conventional ink fixing procedures do not solve problems caused by protruding dots of ink. The strength of the adhesion between the ink and recording medium is not improved. However, the method of fixing ink to the recording paper in accordance with the invention is an improvement over conventional ink fixing.

In accordance with the invention, the ink can be fixed to the recording paper without contacting the ink to any part of the fixing mechanism. A heat roll method utilizing heat conduction (HEAT.R), heat plate method (HEAT.P), flash lamp method utilizing radiant heat (FLASH), infrared heater method (I.R.H.), oven method (OVEN), halogen lamp (HALOGEN) or the like can be used. The ink on the recording medium should be heated to a temperature between about 40° C. and 90° C., preferably between about 40° C. and 80° C. and most preferably between about 40° C. and 70° C. When solid ink is used, a pressure roll method (PRESS.R) can also be used.

During printing with an ink composition prepared in accordance with the invention, the ink is jetted towards the recording medium in the form of a uniform liquid solution. When a semi-solid ink composition is employed, the ink contacts the recording medium and the first component only selectively permeates into the recording medium. This increases the concentration of the colorant and the second component in the recorded dot of ink and the ink cools on the recording medium. The color materials and the second component are deposited on the recording medium due to the difference in solubility at the increased concentrations. The second component and color materials are fixed to the recording medium in their original dot shape and only the first component permeates into and spreads through the recording medium in a blotted shape. As a result, there is no blotting of the coloring material and good dot reproducibility. When employing a solid ink composition, after the dot of ink contacts the recording medium, heat or pressure is applied to insure that the first component adequately permeates into the recording medium while the second component and colorant are deposited onto the recording medium as with the semi-solid ink composition.

Fixing the dot of ink by one of the above mentioned fixing methods remelts the first component causing it to permeate thoroughly into the recording medium. The color materials are maintained in position by the solid second component and do not permeate into fibers of the recording medium as the first component permeates therein. The coloring materials are thereby fixed to the recording medium by the first component which operates as fixer. Because the initial diameter of the printed dots are maintained, extremely high dot reproducibility can be achieved.

The ink composition in accordance with the invention is either solid or semisolid at ambient temperatures and can be prepared by conventional methods. For example, the first component, second component and colorant can be mixed together. The mixture is melted by heating to a temperature above the melting point of the second component, preferably above about 80° C. The melted components are stirred while maintaining the solution at the elevated temperature to obtain a uniformly melted composition. This melted composition is filtered before it is cooled.

The ink can be a semi-solid material at ambient temperatures that has a high viscosity. The viscosity at ambient temperature should be not less than about $10^4$ mPa.s and the viscosity at 60° C. not less than about $10^2$ mPa s. If the viscosity at ambient temperatures is below about $10^4$ mPa.s, ink blotting will occur as it occurs in conventional liquid inks having low viscosity. However, when the viscosity of the ink at ambient temperatures is not less than about $10^4$ mPa.s and preferably above $10^5$ mPa.s, the ink is barely influenced by external force due to its extremely high viscosity. Accordingly, smudging, running and leaking within the recording apparatus and ink pollution can be kept to a minimum.

The ink must have certain properties to be properly jetted onto a recording medium during printing. Generally, it will be heated to between about 80° C. and 120° C. and at this temperature, its viscosity should not be more than about 15.0 mPa.s in order to maintain proper stability of the stored ink supply and of an ink drop during flight from a high speed printing head. To realize high response of not less than 2 to 3 kHz, the viscosity of the melted ink is preferably between about 7.0 and 2.0 mPa.s for the ink to flow to the jet portion smoothly. The surface tension of the fluid ink should be not more than 50 mN/m to avoid problems caused by the formation an ink meniscus in the ink jet nozzle. For ink having high viscosity, the surface tension of the fluid ink should be not more than about 35 mN/m to promote high permeation of the first component into the recording medium during printing.

The ink composition should have the following additional properties. The first component should not dissolve the color material when the first component is in its fluid state and its melting point should be lower then the melting point of the second component. The fluid viscosity of semi-solid ink having high viscosity should be as lows as possible at the elevated temperature of the print head. The viscosity of the first component at an ambient temperature of 25° C. should not be more than about 500 mPa.s, and preferably not more than about 200 mPa.s The ink jet recording apparatus should continue to print at temperatures of −5° C. In order to maintain the advantages of selective permeation of the first component at this low temperature, it must be kept liquid. Accordingly, the fluid point (freezing point) of the first component should be not more than about −10° C. Fluid paraffin and ester phthalate compounds which are liquid at ambient temperatures are examples of appropriate first components having a viscosity of not more than 200 mPa.s and a solidification point not more than −10° C. It is also necessary to limit ink evaporation after the ink is melted, during printing. Accordingly, the ink components should have a vapor pressure at 100° C. of not more than 1 mmHg.

These requirements for the first component are satisfied by the following materials: HI-WHITE-70, 350 (manufactured by Nippon Oil Co., Ltd.); SILKOOL P-55, 70, 360 (manufactured by Matsumura Oil Laboratory), dioctyl phthalate, di-2-ethylhexyl phthalate, di-n-butyl phthalate and mixtures thereof and other similar products and combinations thereof.

When utilizing a solid ink composition, it should be taken into consideration that when printed matter is exposed to high temperatures such as 70° C., such as in a car, the second component, containing the colorant can be melted. This leads to blurring of printed ink. To prevent this problem, the first component for a solid ink composition is preferably formed of a wax material, such as a petroleum wax or a candelilla wax having a high melting point but not more than about 70° C., such as paraffin, paraffin wax, microcystalline wax or solid-type wax formed from a combination of the compounds of these materials. If desired, a plurality of these materials may be mixed. These materials are advantageous in that they prevent a blurring of printed ink exposed to high temperatures, such as temperatures of 70° C. Specifically, the following materials are desirable as the first component:

1. Paraffin:

n-paraffin or iso-paraffin, in which the number of carbon atoms is between 23 and 32:

2. Paraffin wax:

No. 115, 120, 125, 130, 135, 140, 150, 155 (manufactured by Nippon Seiro Co. Ltd.);

HNP-3, 9, 10, 11, 16 (manufactured by Nippon Seiro Co., Ltd.);

SP-0145, 1035, 3040, 3035, 0110 (manufactured by Nippon Seiro Co., Ltd.);

3. Microcystalline wax and others:

Hi-Mic-2045, 1045 (manufactured by Nippon Seiro Co., Ltd.);

CARTOWAX-3025, 3735, 3646 (manufactured by Nippon Serei Co., Ltd.);

4. Carnauba wax.

The second component must also satisfy certain requirements. The second component must dissolve the coloring material and its melting point must be higher than the melting point of the first component. These properties are satisfied by compounds including fatty amides, aromatic amides, aromatic sulfonamides, fatty acids, fatty dibasic acids and the like. Suitable compounds include amide erucate; amide laurate; coconut acid amide; stearic acid amide; palmitic acid amide; behenic acid amide; brassidic acid amide; acetamide; benzamide; propionamide; amide oleate; ricinoleic acid amide, such as Amide-O and HT-P, C (manufactured by Lion Akzo Co., Ltd), Amide Fatty Acid-S, T, P, C and 0 (manufactured by Kao Corp.), O-toluenesulfonamide, P-toluenesulfonamide, azelaic acid, glutaric acid, sebacic acid and the like. If desired, a plurality of these materials may be mixed.

A fatty acid amide suitable for the second component, it can be prepared by removing water from a fatty acid ammonium salt or by reacting fats or fatty esters with ammonia.

When fluid paraffin is used as the first component, the melting point (freezing point) of the second component should be not less than about 50° C. higher and preferably not less than 80° C. higher than the melting point (freezing point) of the first component. If the difference of melting or freezing points is less then 50° C., the solubility of the second component in the first component will be higher at an ambient temperature. As a result, the effects of selective permeation of the first component into the recording medium will not be sufficient and the printed ink image will be unclear.

When petroleum wax is used as the first component, the difference of the melting points should be not less than about 10° C., and preferably not less than about 20° C. If the difference in melting points is less than about 10° C., because there are variations in heating temperatures during heat fixing, the second component can be unintentionally melted while the first component is melted. As a result, the beneficial effects from selective permeation of only the first component are prevented and the printed image will be unclear.

If the melting point of the second component is too low in a semi-solid ink composition, the ink image formed by the second component and colorant will be melted by pressure or heat if exposed to high temperatures after printing. This will lead to blurred ink or transfer of ink to other objects. If these problems arise at temperatures of below about 50° C., the melting point of the second component is too low. Accordingly, the melting point of the second component should not be less than about 60° C.

The melting point of the second component will often decrease as the first component melts during the ink fixing step. This is undesirable, especially when employing a solid ink composition. To prevent this from causing problems and to obtain stable ink images under practical conditions of up to about 70° C., the melting point of the second component should be not less than about 80° C. In the examples hereinafter described, the second components are selected from materials having a melting point of not less than about 60° C.

The coloring materials should have certain properties. The colorant should not be dissolved by the first component. However, it must be dissolved by the second component or vice versa. Additionally, the colorant should preferably be an oil soluble dye having good heat and water resistance. Specifically, desirable materials include the following:

Black dye—C. I. Solvent Black 3, 22, 23;° C. I. Acid Black 123; Sumiplast Black G (BKG), 3BA (manufactured by Sumitomo Chemical Co., Ltd.); Sumisol Black AR sol. (manufactured by Sumitomo Chemical Co., Ltd.); Oil Black BY, BS (manufactured by Orient Chemical Co., Ltd.); Nigrosin; Aizen Spiron Black GMH (manufactured by Hodogaya Chemical Co., Ltd.)

Yellow dye—C. I. Solvent Yellow 19, 21, 61, 80; Aizen Spilon Yellow GRH special (manufactured by Hodogaya Chemical Co., Ltd.); Sumiplast Yellow GG, FC (manufactured by Sumitomo Chemical Co., Ltd).

Red dye. Magenta dye—C. I. Solvent Red 8, 49, 81, 82, 83, 84, 100, 109, 121; C. I. Dispers Red 9; Sumiplast Red AS, 3B, FB (manufactured by Sumitomo Chemical Co., Ltd.); Aizen Spilon Red GEH special (manufactured by Hodogaya Chemical Co., Ltd.);

Blue dye, Cyan Dye—C. I. Solvent Blue 11, 12, 25, 36, 55, 73; Sumiplast Blue 3R BG (manufactured by Sumitomo Chemical Co., Ltd.); Sumiplast Turquoise Blue B (manufactured by Sumitomo Chemical Co., Ltd.).

Complementary colored dye—Aizen Spilon Violet C-RH (manufactured by Hodogaya Chemical Co., Ltd.); Aizen Spilon Yellow C-GNHnew (manufactured by Hodogaya Chemical Co., Ltd.); Aizen methyl Violet Base (manufactured by Hodogaya Chemical Co., Ltd.); Aizen Crystal Violet powder (manufactured by Hodogaya Chemical Co., Ltd.); Aizen Methyl Violet pure special (manufactured by Hodogaya Chemical Co., Ltd.); Aizen Victoria pure Blue BOH conc. (manufactured by Hodogaya Chemical Co., Ltd.); Aizen Green C-GH (manufactured by Hodogaya Chemical Co., Ltd.); Aizen S.P.T. Orange 6 (manufactured by Hodogaya Chemical Co., Ltd.), and the like.

The amount of coloring material should be less than about 10% of the total weight of the ink composition. To improve the stability of flying ink under the high speed response of a print head and to achieve the proper viscosity, preferably colorant composition should not be more than about 5% of the weight of the ink composition. This colorant can be a single dye or several dyes can be mixed.

If the ink composition is a semisolid ink having high viscosity, in order to accelerate the permeation of the first component into the recording medium during printing, an ester phthalate compound or polyol-benzoate can be added. These compounds are organic components which exhibit super cooling phenomenon. After the dot of ink is printed, the increase in viscosity caused by the decrease of the temperature of the first component can be temporarily stopped and the permeation of ink into the recording medium will be accelerated. Specifically, desirable materials include dicyclohexyl phthalate, dioctyl phthalate, di-2-ethylhexyl phthalate, glyceryl-tribenzoate, trimethylolethane-tribenzoate, pentaerythritol teterabenzoate and the like. The amount of these materials should not be more than 10% of the weight of the ink composition and preferably not more than about 7%. To insure stable ink images at a temperature of about 70° C., the percentage of these materials is most preferably not less than about 5 wt %.

Because the ink compositions prepared in accordance with the invention are heated during printing, antioxidants to inhibit oxidation due to this heating can be added as desired. Specifically, dibutyl hydroxy toluene (BHT), IRGANOX 1010, 1035, 1035FF, 1076 (manufactured by Chiba Geigy Japan Co., Ltd.) or the like can be added.

The following examples are set forth to describe ink compositions and printing apparatuses in accordance with the invention more clearly. These examples are intended to be illustrative only and are not presented in a limiting sense. All percentages set forth are by weight, unless otherwise indicated. Examples 1 and 2 relate to semi-solid ink compositions having high viscosities and Examples 3 and 4 relate to solid ink compositions.

Example 1

| Ink Composition 1 | | |
|---|---|---|
| Coloring Material: | C.I. Solvent Black 23 | 2.0% |
| First Component (D1): | Hi-White 70 | 83.7% |
| Second Component (D2): | palmitic acid amide | 9.3% |
| Other Components (D3): | dicyclohexyl phthalate | 4.9% |
| | dibutyl hydroxy toluene | 0.1% |

(E1:E2 = 9:1)

A mixture of the above components was melted at 120° C. and stirred during heating for three hours. At this high temperature, the melted material was filtered with a Membrane filter made of Teflon, having a pore size of 5μ. This ink composition had a viscosity of 4.0 mPa.s at 110° C. and a surface tension of 29.0 mN/m.

A conventional "ink jet on demand" type of ink jet head which can use hot melt ink was used to print dots of ink with the ink described above at 100° C. The ink jet head was filled with this ink and bit image printing and character printing were performed on: wood free paper, bond paper, PPC paper and the like. The printing was evaluated for friction resistance, blocking and reproducibility and good results were obtained.

Test A1—Friction Resistance

After printing on various recording materials, the printed surface was rubbed with tissue paper. The printed surface was then tested to determine whether ink pollution occurred as time passed. The test results were as follows: After 10 seconds, there was no ink pollution . . . very good (VG); After 20 to 30 seconds, there was no ink pollution . . . good (G); and After over 30 seconds, there was ink pollution . . . no good (NG).

Although there were some differences in paper quality, all of the tested recorded ink was considered better than "G" over all. The printed material exhibited good reproducibility and friction resistance.

Test A2—Printed Material Blocking

Blocking is a phenomenon of ink blurring on the recording medium and ink transferring to other objects that are placed on the recording medium. Blank recording media were stacked on the recorded material and pressure was applied thereon at a temperature of 50° C., for 24 hours. The recording media were tested to determine whether there was ink pollution and whether ink was transferred onto the stacked blank recording media. The diameter of the ink dots were maintained in the same condition as before the test. Accordingly, there was not any ink pollution or ink transfer. Further, when the recorded materials were heated from behind at 70° C. for ink fixing after printing, there was no ink blur.

Test A3—Fixed Dot Reproducibility

The degree of spreading of an ink dot diameter after ink fixing (L1) was tested as to whether it falls within the limits of the following formula with respect to the dot diameter before ink fixing (L2):

$$L1 \leq 1.5 L2$$

Ink fixing was carried out according to the conditions shown in Table 1 below. The diameter of dots of the fixed ink composition according to Example 1 satisfied the above formula.

Overall, the printed ink is considered to be very good in resisting blocking as well as having good reproducibility and friction resistance.

Example 2

The ink compositions shown as Nos. 2-1 to 2-12 of Table 1 were prepared as in Example 1. These Examples show compositions for semisolid inks in addition to the composition of Example 1. Table 1 shows materials that were used as the first component, the second component, the other components and color materials and the amount used.

Composition Nos. 2-1 and 2-10 show especially good printing properties in high speed response since they have low viscosity. Further, all the specific compositions had good selective permeation of the first component into the recording medium.

Comparative Example C

The ink compositions shown as Example Nos. C-1 to C-3 of Table 1 were prepared as in Example 1. The compositions of Example and the Comparative Example C ink compositions were also subjected to tests A1, A2 and A3 in the same manner as in Example 1. The results of tests A1 to A3 are shown in Table 3 below. When each fixing method shown in Table 1 was carried out, all the Example 2 inks show good results under tests A1 and A3 and some exhibited very good results for test A2. Furthermore, when they were subjected to test A2, at a temperature of 70° C., the examples in which the second component had a melting point of not less than 80° C. showed good printing results.

TABLE 1

| THE FIRST COMPONENT THE SECOND COMPONENT COLORING MATERIAL OTHER COMPONENT | EXAMPLE | | | | | | | |
|---|---|---|---|---|---|---|---|---|
| | 2-1 | 2-2 | 2-3 | 2-4 | 2-5 | 2-6 | 2-7 | 2-8 |
| THE FIRST COMPONENT (FLUID PARAFFIN) (E1) | | | | | | | | |
| HI-WHITE 70 | — | — | 44.0 | — | — | 32.5 | 8.2 | — |
| HI-WHITE 350 | — | 81.7 | — | 44.3 | — | — | — | 29.7 |
| SILKOOL P-55 | 92.0 | — | 40.5 | — | 48.75 | — | — | 59.4 |
| SILKOOL P-70 | — | — | — | 44.3 | — | — | — | — |
| MORESCO-WHITE P-100 | — | — | — | — | — | — | — | — |
| MORESCO-WHITE P-200 | — | — | — | — | — | — | — | — |
| DI-2-ETHYLHEXYLPHTHALATE | — | — | — | — | — | — | — | — |
| THE SECOND COMPONENT (E2) | | | | | | | | |
| PALMITIC ACID AMIDE | 2.0 | — | — | 4.5 | — | 65.0 | 81.8 | — |
| STEARIC ACID AMIDE | — | — | — | 5.4 | — | — | — | 8.9 |
| AMIDE LAURATE | — | 16.3 | — | — | — | — | — | — |
| AMIDE ERUCATE | — | — | — | — | — | — | — | — |

TABLE 1-continued

| | | | | | | | | |
|---|---|---|---|---|---|---|---|---|
| AMIDE HT-P | — | — | — | — | — | — | — | |
| AMIDE-C | — | — | 8.5 | — | — | — | — | |
| RECINOLEIC ACID AMIDE | | | | | 48.75 | | | |
| AMIDE OLEATE | | | | | | | | |
| BEHENIC ACID | | | | | | | | |
| GLUTARIC ACID | | | | | | | | |
| P-TOLUENE SULFONAMIDE | — | — | — | — | — | — | — | |
| COLORING MATERIAL (DYE) | | | | | | | | |
| C.I. SOLVENT YELLOW 19 | | | | | | 1.2 | | |
| C.I. SOLVENT BLACK 23 | | | | | | | 10.0 | |
| K.I. SOLVENT BLACK 3 | — | 2.0 | — | — | — | — | — | — |
| C.I. SOLVENT BLACK 22 | — | — | — | 1.5 | — | — | — | — |
| SUMIPLAST BLACK 3BA | — | — | 3.0 | — | — | — | — | — |
| SUMIPLAST BLACK BKG | 1.0 | — | — | — | — | — | — | — |
| C.I. SOLVENT BLUE 55 | — | — | — | — | 2.5 | 1.3 | — | — |
| C.I. SOLVENT RED 109 | — | — | — | — | — | — | — | 2.0 |
| C.I. SOLVENT YELLOW 61 | — | — | — | — | — | — | 3.0 | |
| OIL BLACK BY | — | | | | | | | |
| AIZENSPIRON BLACK GMH | — | — | — | — | — | — | — | — |
| OTHER COMPONENT (E3) | | | | | | | | |
| BHT | | | | | | | | |
| DIOCTYL PHTHALATE | — | — | 4.0 | — | — | — | — | |
| DICYCLOHEXL PHTHALATE | 5.0 | — | — | — | — | — | | |
| E1:E2 | 46:1 | 5:1 | 10:1 | 9:1 | 1:1 | 1:2 | 1:10 | 10:1 |
| (FIXING METHOD) | HEATROLL | I.R.H | FLASH | HEAT.R | HEAT.P | HEAT.P | HEAT.P | I.R.H |
| (FIXING TEMPERATURE) (°C.) | 70 | 60 | 75 | 80 | 45 | 70 | 70 | 90 |
| VISCOSITY mPa.s:110° C. | 2.0 | 5.5 | 7.0 | 6.5 | 10.0 | 10.0 | 15.0 | 6.0 |
| SURFACE TENSION nM/m:110° C. | 30.0 | 29.5 | 29.0 | 29.5 | 28.5 | 28.5 | 28.5 | 29.7 |

| THE FIRST COMPONENT THE SECOND COMPONENT COLORING MATERIAL OTHER COMPONENT | EXAMPLE | | | | | COMPARATIVE EXAMPLE | | |
|---|---|---|---|---|---|---|---|---|
| | 2-9 | 2-10 | 2-11 | 2-12 | 2-13 | C-1 | C-2 | C-3 |
| THE FIRST COMPONENT (FLUID PARAFFIN) (E1) | | | | | | | | |
| HI-WHITE 70 | — | — | 10.0 | 50.0 | — | 88.2 | | 96.2 |
| HI-WHITE 350 | 65.4 | — | — | — | — | | | |
| SILKOOL P-55 | — | 90.0 | — | — | — | | 6.1 | |
| SILKOOL P-70 | — | — | — | — | — | | | |
| MORESCO-WHITE P-100 | — | — | — | 25.0 | — | | | |
| MORESCO-WHITE P-200 | — | — | 56.5 | — | — | | | |
| DI-2-ETHYLHEXYLPHTHALATE | — | — | — | — | 85.0 | | | |
| THE SECOND COMPONENT (E2) | | | | | | | | |
| PALMITIC ACID AMIDE | | — | 8.5 | — | — | FORM AMIDE mp:2.5° C. | | |
| STEARIC ACID AMIDE | | — | — | — | — | | | 1.8 |
| AMIDE LAURATE | | — | — | — | — | | | |
| AMIDE ERUCATE | | — | — | — | — | 9.8 | | |
| AMIDE HT-P | 21.8 | — | — | — | — | | 91.9 | |
| AMIDE-C | — | — | — | — | — | | | |
| RECINOLEIC ACID AMIDE | | | | | | | | |
| AMIDE OLEATE | 3.0 | — | — | — | | | | |
| BEHENIC ACID | | | 20.0 | — | — | | | |
| GLUTARIC ACID | | | — | 20.0 | | | | |
| P-TOLUENE SULFONAMIDE | — | — | — | — | 10.0 | | | |
| COLORING MATERIAL (DYE) | | | | | | | | |
| C.I. SOLVENT YELLOW 19 | | | — | — | — | | | |
| C.I. SOLVENT BLACK 23 | | | — | 5.0 | — | | | |
| K.I. SOLVENT BLACK 3 | | — | — | — | — | 2.0 | | 2.0 |
| C.I. SOLVENT BLACK 22 | | — | — | — | — | | | |
| SUMIPLAST BLACK 3BA | — | — | — | — | — | | | |
| SUMIPLAST BLACK BKG | — | 2.0 | — | — | — | | | |
| C.I. SOLVENT BLUE 55 | — | — | — | — | — | | 2.0 | |
| C.I. SOLVENT RED 109 | 1.5 | — | — | — | — | | | |
| C.I. SOLVENT YELLOW 61 | 1.5 | — | — | — | — | | | |
| OIL BLACK BY | | | 5.0 | — | — | | | |
| AIZENSPIRON BLACK GMH | — | — | — | — | 5.0 | | | |
| OTHER COMPONENT (E3) | | | | | | | | |
| BHT | | | | | | | | |
| DIOCTYL PHTHALATE | — | — | — | — | | | | |
| DICYCLOHEXL PHTHALATE | 9.8 | 5.0 | — | — | | | | |
| E1:E2 | 3:1 | 30:1 | 2.3:1 | 3.75:1 | | 9:1 | 1:15 | 54:1 |
| (FIXING METHOD) | PRESS | HEAT.R | HEATROLL | FLASH | | HEAT.P | HEAT.P | |
| (FIXING TEMPERATURE) | R.T. | 65 | 55 | 70 | | 40 | 90 | |

TABLE 1-continued

| (°C.) | | | | | | |
|---|---|---|---|---|---|---|
| VISCOSITY mPa.s:110° C. | 12.5 | 3.0 | 5.0 | 5.5 | 2.0 | 12.5 |
| SURFACE TENSION nM/m:110° C. | 30.0 | 30.0 | 26.0 | 30.5 | 29.5 | 30.0 |

TABLE 2

| THE FIRST COMPONENT THE SECOND COMPONENT COLORING MATERIAL OTHER COMPONENT | EXAMPLE | | | | | | | | |
|---|---|---|---|---|---|---|---|---|---|
| | 4-1 | 4-2 | 4-3 | 4-4 | 4-5 | 4-6 | 4-7 | 4-8 | 4-9 |
| THE FIRST COMPONENT (PETROLEUM WAX) (E1) | | | | | | | | | |
| n-PARAFIN (C = 32) | — | 81.7 | — | — | — | — | — | — | — |
| PARAFIN WAX No. 150 | — | — | — | 44.3 | — | — | — | — | — |
| HNP-3 | — | — | — | — | — | 59.4 | — | — | — |
| HNP-10 | — | — | 44.0 | — | — | — | — | — | — |
| SP-0145 | — | — | — | 44.3 | — | — | — | — | — |
| SP-3040 | — | — | — | — | — | — | 72.65 | — | — |
| CARTWAX-3025 | — | — | — | — | 48.75 | — | — | — | 85.0 |
| HI-MIC-2045 | 90.5 | — | 44.1 | — | — | — | — | — | — |
| HI-MIC-1045 | — | — | — | — | — | 29.7 | — | — | — |
| CANDELILLA WAX | — | — | — | — | — | — | — | 87.2 | — |
| THE SECOND COMPONENT (E2) | | | | | | | | | |
| PALMITIC ACID AMIDE | — | — | — | — | — | — | — | — | — |
| STEARIC ACID AMIDE | — | — | — | 9.9 | — | 8.9 | — | 9.8 | — |
| AMIDE LAURATE | — | 16.2 | — | — | — | — | — | — | — |
| AMIDE ERUCATE | — | — | — | — | 48.55 | — | — | — | — |
| AMIDE HT-P | 4.5 | — | — | — | — | — | 24.25 | — | — |
| AMIDE-C | — | — | 8.8 | — | — | — | — | — | — |
| BEHENIC ACID | — | — | — | — | — | — | — | — | 10.0 |
| COLOURING MATERIAL (DYE) | | | | | | | | | |
| C.I. SOLVENT BLACK 3 | — | 2.0 | — | — | — | — | — | — | — |
| C.I. SOLVENT BLACK 22 | — | — | — | 1.5 | — | — | — | — | — |
| SUMIPLAST BLACK 3BA | — | — | 3.0 | — | — | — | — | — | — |
| SUMIPLAST BLACK BKG | 5.0 | — | — | — | — | — | — | — | — |
| C.I. SOLVENT BLUE 55 | — | — | — | — | 2.5 | — | — | — | — |
| C.I. SOLVENT RED 109 | — | — | — | — | — | 2.0 | — | — | — |
| C.I. SOLVENT YELLOW 61 | — | — | — | — | — | — | 3.0 | — | — |
| AIZENSPIRON BLACK gmh | — | — | — | — | — | — | — | 3.0 | 5.0 |
| OTHER COMPONENT | | | | | | | | | |
| BHT | — | 0.1 | — | — | 0.2 | — | — | — | — |
| IRGANOX-1010 | — | — | 0.1 | — | — | — | 0.1 | — | — |
| E1:E2 | 20:1 | 5:1 | 10:1 | 9:1 | 1:1 | 10:1 | 3:1 | 9:1 | 9:1 |
| (FIXING METHOD) | HEATROLL | I.R.H | FLASH | HEAT.R | HEAT.P | I.R.H | PRESS R.T. | HEAT.R | HEAT.P |
| (FIXING TEMPERATURE) (°C.) | 70 | 60 | 75 | 80 | 60 | 90 | | 70 | 65 |
| VISCOSITY mPa.s:110° C. | 2.0 | 5.5 | 7.0 | 6.5 | 5.0 | 6.0 | 9.5 | 6.0 | 4.8 |
| SURFACE TENSION nM/m:110° C. | 30.0 | 29.5 | 29.0 | 29.5 | 28.5 | 29.7 | 30.0 | 30.0 | 29.5 |

| THE FIRST COMPONENT THE SECOND COMPONENT COLORING MATERIAL OTHER COMPONENT | COMPARATIVE EXAMPLE | | |
|---|---|---|---|
| | D-1 | D-2 | D-3 |
| THE FIRST COMPONENT (PETROLEUM WAX) (E1) | | | |
| n-PARAFIN (C = 32) | — | — | — |
| PARAFIN WAX No. 150 | — | — | — |
| HNP-3 | 88.2 | — | 94.2 |
| BNP-10 | — | — | — |
| SP-0145 | — | — | — |
| SP-3040 | — | — | — |
| CARTWAX-3025 | — | — | — |
| HI-MIC-2045 | — | 32.7 | — |
| HI-MIC-1045 | — | — | — |
| CANDELILLA WAX | — | — | — |
| THE SECOND COMPONENT (E2) | | | |
| PALMITIC ACID AMIDE | AMIDE OLEATE mp 73° C. 9.8 | — | — |
| STEARIC ACID AMIDE | | — | 3.8 |
| AMIDE LAURATE | | — | — |
| AMIDE ERUCATE | | — | — |
| AMIDE HT-P | | 65.3 | — |
| AMIDE-C | | — | — |

TABLE 2-continued

| | | | |
|---|---|---|---|
| BEHENIC ACID | | | |
| COLOURING MATERIAL (DYE) | | | |
| C.I. SOLVENT BLACK 3 | 2.0 | — | 2.0 |
| C.I. SOLVENT BLACK 22 | — | — | — |
| SUMIPLAST BLACK 3BA | — | — | — |
| SUMIPLAST BLACK BKG | — | 2.0 | — |
| C.I. SOLVENT BLUE 55 | — | — | — |
| C.I. SOLVENT RED 109 | — | — | — |
| C.I. SOLVENT YELLOW 61 | — | — | — |
| AIZENSPIRON BLACK gmh | — | — | — |
| OTHER COMPONENT | | | |
| BHT | — | — | — |
| IRGANOX-1010 | — | — | — |
| E1:E2 | 9:1 | 1:2 | 25:1 |
| (FIXING METHOD) | HEAT.P | HEAT.P | — |
| (FIXING TEMPERATURE) (°C.) | 65 | 90 | — |
| VISCOSITY mPa.s:110° C. | 6.0 | 9.5 | — |
| SURFACE TENSION nM/m:110° C. | 29.5 | 30.0 | — |

TABLE 3

| | A1:PRINTING FRICTION RESISTANCE | A2:BLOCKING PROPERTIES | A3:DOT REPRODUCibility |
|---|---|---|---|
| (Example) | | | |
| 2-1 | G | VG | G |
| 2-2 | G | G | G |
| 2-3 | G | G | G |
| 2-4 | G | VG | G |
| 2-5 | G | G | G |
| 2-6 | G | VG | G |
| 2-7 | G | VG | G |
| 2-8 | G | VG | G |
| 2-9 | G | G | G |
| 2-10 | G | G | G |
| 2-11 | G | G | G |
| 2-12 | G | G | G |
| 4-1 | VG | VG | VG |
| 4-2 | VG | VG | VG |
| 4-3 | VG | VG | VG |
| 4-4 | VG | VG | VG |
| 4-5 | VG | VG | VG |
| 4-6 | VG | VG | VG |
| 4-7 | VG | VG | VG |
| Comparative (Example) | | | |
| C-1 | G | NG | |
| C-2 | NG | G | |
| C-3 | | | |
| D-1 | VG | G | NG |
| D-2 | VG | NG | G |
| D-3 | | | |

VG: Very-Good
G: Good
NG: No-Good
*In Examples C-3 and D-3, the printing test was not carried out since the coloring material was not dissolved.

The test results of the comparative example were as follows:

Example C-1

The inks that included the fatty amide formamide with a melting point of 2.5° C. as the second component, were liquefied at an ambient temperature. Therefore, during the blocking test (Test A2), ink blurring occurred. Further, even after ink fixing, blurring of printed ink also occurred.

Example C-2

Because the weight ratio (E2) of the second component was greater than the weight ratio (E1) of the first component in comparison with the recommended ratio of E1:E2=1:10, printed ink dots were not sufficiently even. The results of test A1 (friction resistance) were no good. After fixing, the friction resistance was still "no good".

Example C-3

Since the weight ratio (E1) of the first component is greater than the weight ratio (E2) of the second component, rather than E1:E2=50:1, coloring material was not uniformly dissolved when the ink composition was prepared. Therefore, after ink filled the printing head, ink clogging of the nozzle occurred during ink ejection.

Example 3

| Ink Composition 3 | | |
|---|---|---|
| Coloring Material: | C.I. Solvent Black 23 | 2.0% |
| First Component (D1): | HNP-3 | 88.2% |
| Second Component (D2): | stearic acid amide | 9.8% |

(E1:E2 = 9:1)

The mixture of the above components was melted at 120° C., and stirred during heating for three hours. Afterwards, the melted mixture was filtered under pressure with a Membrane filter made of Teflon having pore size of 5µ while the ink was still melted by heating at a high temperature. The obtained ink composition had a viscosity of 5.5 mPa.s at 110° C. and a surface tension of 29.0 mN/m.

Subsequently, the ink compositions of Example 3 were filled in an ink on demand type of ink jet head which can use hot melt ink as in Example 1. After bit image printing and character printing, ink was fixed by heating with a heat plate at 70° C. The results of tests A1 to A3 were good.

Example 4

As in Example 3, ink compositions were formed having the formulations shown in Example Nos. 4-1 to 4-9 of Table 2, above. These examples show a solid ink compositions in accordance with the invention, in addition to the composition shown in Example 3. This table shows the materials that are usable as the first component, the second component, the other components and coloring material and the amounts thereof. The first component of these compositions selectively permeated the recording medium very well during the ink fixing procedure and these compositions exhibited good ink fixing and dot reproducibility.

Comparative Example D

In the same manner as in Example 3, the ink compositions shown in D-1 to D-3 of Table 1 were prepared. Ink compositions from Example 4 and from comparative Example D were tested in the same manner as Example 3 and the results shown in Table 3, above, were obtained. When each fixing method shown in Table 2 was carried out with respect to the above Example 4, tests A1 and A3 showed good results. When test A2 was carried out at a high temperature of 70° C., the examples that included a second component whose melting point was not less than 80° C. showed good results.

Each condition of the above comparative example tested were as follows:

Example D-1

When the second component, a fatty amide, was amide oleate which has a melting point of 73° C., the second component was melted during the fixing step since the melting point decreased after the first component was melted. Therefore, the diameter of dots obtained after the fixing treatment were twice as large as that of the dots before the fixing treatment. Further ink blurring occurred.

Example D-2

Since the weight ratio of the second component (E2) is greater than the weight ratio of the first component (E1) in comparison with a recommended ratio of E1:E2=1:1, the ink dots obtained after fixing were not sufficiently even and blocking occurred during test A2 in which ink dots were exposed to high temperatures.

Example D-3

Since the weight ratio of the first component (E1) is greater than the weight ration of the second component (E2) in comparison with the recommended ratio of E1:E2=20:1, coloring materials were not dissolved uniformly when the ink composition was prepared. Therefore, when ink was filled in a head, the ink clogged the nozzle during ink jet printing.

The fixing process also accelerates the permeation of the first component into the recording medium. Therefore, the fixing process may follow the printing and it may also be carried out by heating the recording medium at the predetermined temperature before and after printing ink compositions according to the present invention can avoid ink pollution when in is supplied in a recording head.

Example 5

The following Example is explained with reference to the accompanying drawings in which similar structures are identically numbered. FIG. 1 is a perspective view of an ink on demand type ink jet recording apparatus 100 for printing in accordance with the invention. In FIG. 1, a recording paper 10 winds around a platen 11 and is pressed against platen 11 by a pair of feed rollers 12 and 13. An ink jet printing head 16 is mounted on a carriage 15 which is guided by a pair of guide shafts 14 and 17 and is movable in parallel along the axis of platen Ink jet head 16 has a plurality of nozzles 28 shown in FIG. 2, which can be controlled individually, to jet drops of ink. Ink jet head 16 scans in the direction of the axis of platen 11 and ink is selectively jetted from nozzles 28, to form ink images on recording paper 10. Recording paper 10 is fed by the rotation of platen 11 and feed rollers 12 and 13. The minor scanning direction is orthogonal to the major scanning direction. Printing is completed on the recording medium.

Figure 2:
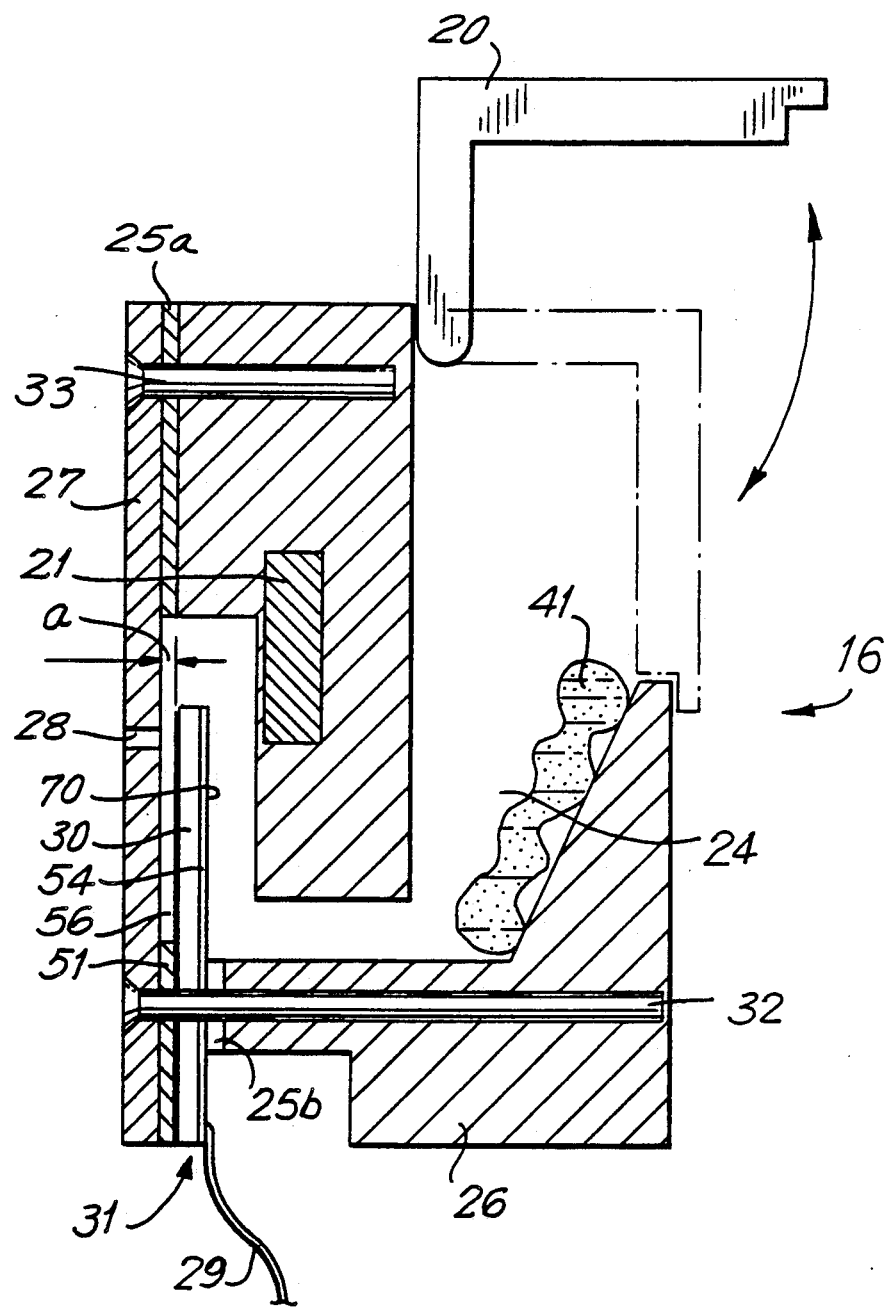
FIG. 2 is a sectional view of an ink on demand ink jet recording head suitable for use in the recording apparatus of FIG.

FIG. 2 is a sectional view of an ink on demand type of ink jet head 16 for jetting a highly viscous liquid ink 41 stored in a reservoir 24 in accordance with the invention. A piezoelectric transducer 31 and a nozzle plate 27 formed with nozzles 28 are J. positioned on a frame 26 over a pair of elastic sheets 25a and 25b and are fixed by a screw 32 and a screw 33. Nozzle plate 27 is formed of a thin metallic plate. A heater 21 is positioned in print head 26 in reservoir 24 in the region of nozzles 28.

Figure 3:
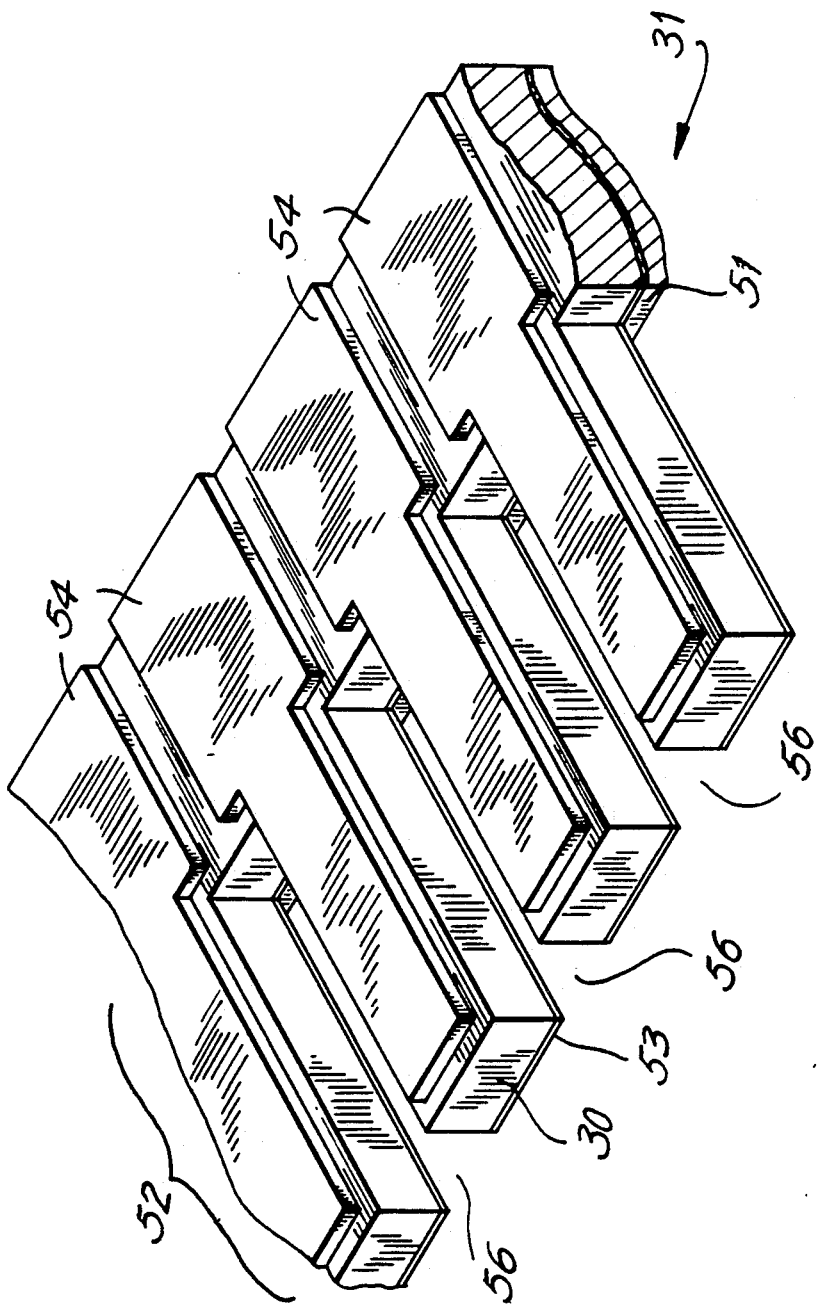
FIG. 3 is a perspective view of the piezoelectric transducers used in an ink jet print head included in an ink on demand recording head.

FIG. 3 is a perspective view of piezoelectric transducer 31. Piezoelectric element 30 is made of PZT and has a common electrode layer 53 including a thin solid layer and a thin spacer layer 51 of nickel on one side and a pattern electrode layer 54 formed of a thin plate of Ni on the other side. Piezoelectric transducer 31 is divided by a notch 56, thereby forming a plurality of vibrators 52.

In FIG. 2, a portion of piezoelectric element 30 is opposed to nozzles 28 with a small gap "a" therebetween. Wires 29 are individually connected to pattern electrodes 54, and voltage is selectively applied to control ink jetting. The ink supply is refilled by hand by opening an ink supply door 20 when ink for head 16 is reduced to be below the predetermined value.

Figure 4:
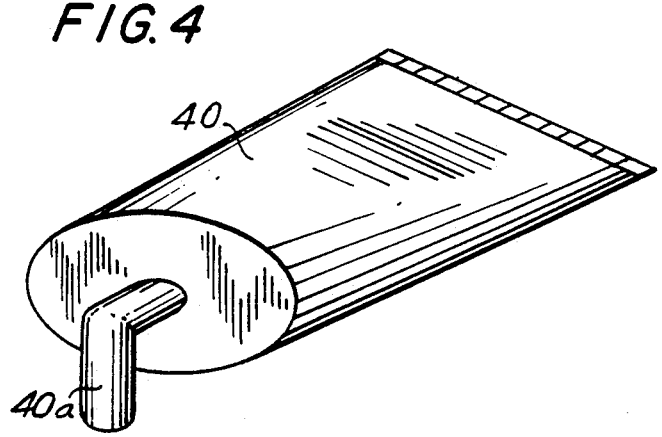
FIG. 4 is a perspective view of an ink storage container constructed in accordance with the invention.
Figure 5:
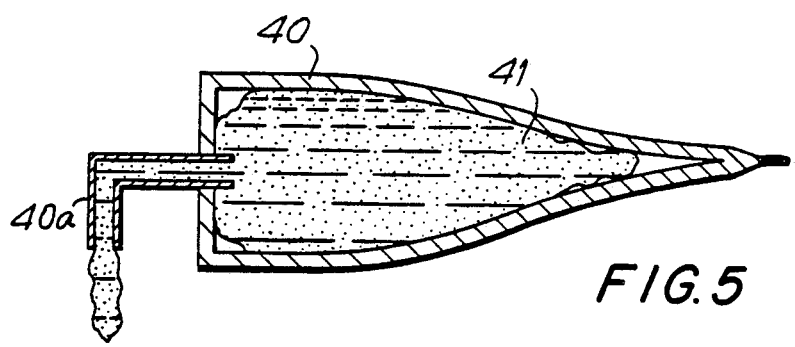
FIG. 5 is a sectional view of the ink storage container of FIG. 4.
Figure 6:
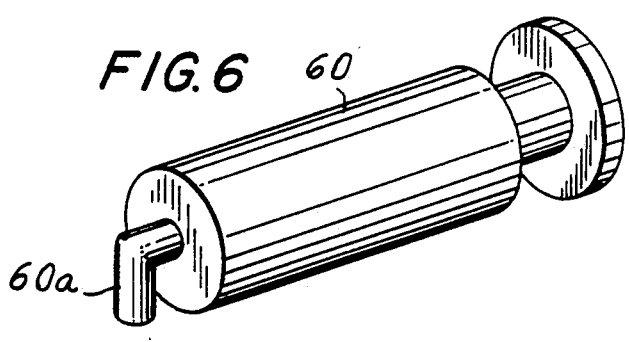
FIG. 6 is a perspective view of another ink storage container suitable for use in the ink on demand recording heads.
Figure 7:
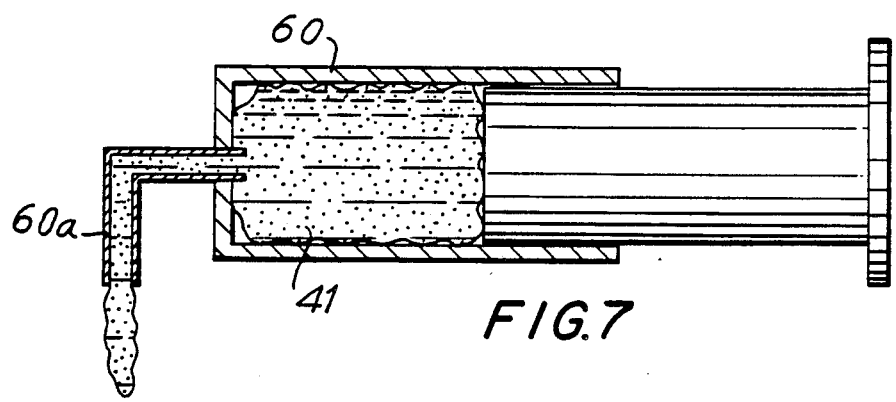
FIG. 7 is a sectional view of the ink storage container of FIG. 6.

FIGS. 4 and 5 show one example of an ink container 40 and feeding tube 40a. Container 40 is a tube shaped container in which an ink composition 41 having high viscosity is stored. FIGS. 6 and 7 show another example of a cylinder shaped container 60 with a feeding tube 60a for storing viscous ink 41.

Operation of print head 16 is as follows. When head 16 is stopped, ink supply door 20 at the rear portion of ink jet head 16 is opened. A quantity of high viscosity ink 41 is pushed out by hand from ink container 40 or 60. A fixed amount of ink is supplied into an ink reservoir 24. Ink supply door 20 is closed and is in an "operating" state.

High viscosity ink 41 moves downwards by gravity from ink reservoir 24 to reach the vicinity of piezoelectric transducer 31. Ink 41 is heated and dissolved uniformly by heater 21 to low viscosity. Ink flows up through a gap 70 between nozzle plate 27 and piezoelectric transducer 31 by capillary action to reach the vicinity of nozzle 28. By heating ink 41 in reservoir 24 of head 16, high viscosity ink 41 will be heated quickly to lower viscosity so it can flow downward quickly.

The jet operation of liquid ink is carried out by displacing the piezoelectric transducer towards nozzle 28. Ink outlet tube 40a or 60a of ink containers 40 and 60 are shaped like a hooked tube as shown in FIGS. 4 to 7. This shape is suitable for supplying ink to the ink supply part of head 16. Further, the method for supplying ink is not limited to supplying ink by hand and an automatic feed ink container can be incorporated in printing apparatus 100 so that ink can be automatically supplied by a pressure apparatus.

Ink compositions having a viscosity of about $10^4$ mPa.s will flow and ink will be moved by gravity. Further, ink compositions having a viscosity of more than $10^5$ mPa.s are in a hard grease state. Since the shape does not change significantly, it can be easily handled to feed a print head properly.

In print head 16 ink flows upwardly to supply nozzle 28. However, ink can be advantageously supplied from above to utilize ink movement from gravity by providing the nozzle portion at the lower portion of a print head. In the above examples, a semisolid ink having high viscosity as described in Example 2 is supplied to the ink jet head. However, a solid ink can be also be used. Solid ink compositions promptly solidify even if liquefied ink leaks from the head. Such ink is dropped into a storage area and moves downwardly by gravity. Solid ink compositions can also be treated easily to feed an ink jet nozzle.

The ink compositions prepared in accordance with the invention provide high ink fixing strength and good print quality. Friction resistance and dot reproducibility is good regardless of the quality of the recording media. These advantages are due to the selective permeation of the first component into the recording medium and the depositing of coloring material. Further, the ink fixing process also makes the ink permeate evenly, the reproducibility of printed dots is good and the strength of fixing is improved without ink blurring. The ink compositions are solid or semisolid at an ambient temperature and rarely flow unintentionally. Therefore, when ink compositions are supplied into the printing head, the ink supply method can be simplified which saves labor, and the supply space can be reduced. Furthermore, even if ink is unintentionally placed in other portions than the supply system when filling the print head, ink will remain in a limited area without contaminating a wide region of the printing apparatus. In addition, the surface of liquid ink will not be displaced by changing the speed of the print head during acceleration and deceleration. Therefore, the generation of cavitation bubbles on the ink surface can be prevented, and ink jet movement of a head can be stabilized. Since the ink is solid or semisolid it does not permeate into a user's clothes or documents. Therefore, a user can be free from the trouble of ink pollution during ink supply.

It will thus be seen that the objects set forth above, among those made apparent from the preceding description, are efficiently attained and, since certain changes may be made in carrying out the above method, in the described product, and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

I claim:

1. An ink composition having a viscosity of not less than about $10^4$ mPa.s at normal ambient temperatures and being liquid at elevated temperatures for ink jet recording on a recording medium, comprising:
   a colorant;
   a first component which will permeate into the recording medium;
   a second component having a higher melting point than the first component which will not substantially permeate into the record medium with the first component;
   the colorant, first component and the second component selected from materials which will form a uniform liquid phase when melted and the second component and colorant will be fixed to the recording medium by the first component upon cooling to form a recording on the first component upon cooling.

2. The ink composition of claim 1, wherein the weight ratio of the first component to the second component is between 50:1 and 1:10.

3. The ink composition of claim 1, wherein the melting point of the second component is at least about 10° C. higher than the melting point of the first component.

4. The ink composition of claim 1, wherein the melting point of the second component is at least about 50° C. higher than the melting point of the first component.

5. The ink composition of claim 1, wherein the first component is selected from the group consisting of petroleum wax and candellia wax and combinations thereof.

6. The ink composition of claim 5, wherein the petroleum wax is selected from the group consisting of paraffin, paraffin wax, microcrystalline wax and mixtures thereof.

7. The ink composition of claim 1, wherein the melting point of the second component is not less than 60° C.

8. The ink composition of claim 1, wherein the second component is selected from the group consisting of fatty acid amides, aromatic amides, aromatic sulfonamides, fatty acids and fatty dibasic acids and combinations thereof.

9. The ink composition of claim 1, wherein the colorant is a dye.

10. The ink composition of claim 1, further including at least one of an esther phthalate and a poly-benzoate.

11. The ink composition of claim 1, wherein the first component is selected from the group consisting of ester phthalates and fluid paraffin.

12. The ink composition of claim 1, wherein the first component is petroleum wax.

13. An ink composition that is in a solid state at normal room temperatures but being liquid at elevated temperatures for ink jet recording on a recording medium, comprising:
    a colorant;
    a first component which will permeate into the recording medium;
    a second component having a melting point at least about 10° C. higher than the first component;
    the colorant, first component and the second component forming a uniform liquid phase when melted and the second component and colorant forming a recording on the first component upon cooling.

14. The ink composition of claim 3, wherein the first component is a wax, selected from the group consisting of petroleum wax and candelilla wax and combinations thereof.

15. The ink composition of claim 13, wherein the weight ratio of the first component to the second component is between 50:1 and 10:1.

16. The ink composition of claim 13, wherein the melting point of the second component is not less than 60° C.

17. The ink composition of claim 13, wherein the second component is selected from the group consisting of fatty acid amides, aromatic amides, aromatic sulfonamides, fatty acids and fatty dibasic acids and combinations thereof.

18. The ink composition of claim 13, wherein the colorant is a dye.

19. An ink composition having a viscosity of more than about $10^4$ mPa.s at normal ambient temperatures and liquid at elevated temperatures for ink jet printing on a recording medium, comprising:
a colorant;
a first component formed of a wax which will permeate into the recording medium when liquid; and
a second component which will not substantially permeate into the recording medium with the first component, the second component formed of an organic material selected from the group consisting of fatty amides, aromatic amides, aromatic sulfonamides, fatty acids, fatty dibasic acids, and combinations thereof and having a melting point higher than the melting point of the first component.

20. The ink composition of claim 19, wherein the second component is selected from the group consisting of amide erucate, amide laurate, coconut acid amide, stearic acid amide, palmitic acid amide, behenic acid amide, brassidic acid amide, acetamide, benzamide, propionamine, amide oleate, ricinoleic acid amide, O-toluenesulfonamide, P-toluenesulfonamide, azelaic acid, glutaric acid, sebacic acid, and combinations thereof.

21. The ink composition of claim 19, wherein the colorant will not dissolve in the first component.

22. The ink composition of claim 19, wherein the first component has a melting point of less than −10C.

23. The ink composition of claim 19, wherein the weight ratio of the first component to the second component is between 50:1 and 1:10.

24. The ink composition of claim 19, wherein the first component has a viscosity of below about 500 mPa.s at 25° C.

25. The ink composition of claim 19, further including a temperature control component selected from the group consisting of ester phthalates and polyol-benzoates.

26. The ink composition of claim 25, wherein the temperature control component is selected from the group consisting of dicyclohexyl phthalate, dioctyl phthalate, di-2-ethylhexyl phthalate, glyceryl-tribenzoate, trimethylolethane-tribenzoate, pentaerythritol teterabenzoate, and combinations thereof.

27. An ink composition for ink jet printing on a recording medium, comprising:
a colorant;
a first component formed of a wax which will permeate into the recording medium when liquid;
a second component formed of an organic material selected from the group consisting of fatty amides, aromatic amides, aromatic sulfonamides, fatty acids, fatty dibasic acids, and combinations thereof and having a melting point higher than the melting point of the first component; and
a temperature control component selected from the group consisting of ester phthalates and polyolbenzoates.

28. The ink composition 27, wherein the temperature control component is selected from the group consisting of dicyclohexyl phthalate, dioctyl phthalate, di-2-ethylhexyl phthalate, glyceryl-tribenzoate, trimethylolethane-tribenzoate, pentaerythritol teterabenzoate, and combinations thereof.

29. An ink composition that is in a semi-solid state at normal room temperature, but is liquid at elevated temperatures, for ink jet recording on a recording medium, comprising:
a colorant;
a first component which will permeate into the recording medium when the composition is jetted onto the recording medium during printing; and
a second component having a melting point at least about 50° C. higher than the melting point of the first component and which will not substantially permeate into the recording medium with the first component when the composition is jetted onto the recording medium during printing;
the colorant, first component and second component selected from materials which will form a uniform liquid phase when melted so that the second component and colorant will be fixed to the recording medium by the first component upon cooling to form a recording on the first component.

30. The ink composition of claim 29, wherein the weight ratio of the first component to the second component is between 50:1 and 10:1.

31. The ink composition of claim 29, wherein the melting point of the second component is not less than 60° C.

32. The ink composition of claim 29, wherein the second component is selected from the group consisting of fatty acid amides, aromatic amides, aromatic sulfonamides, fatty acids and fatty dibasic acids and combinations thereof.

33. The ink composition of claim 29, wherein the colorant is a dye.

34. The ink composition of claim 29, wherein the viscosity of the ink composition at normal ambient temperature is not less than about $10^4$ mPa.s.

35. The ink composition of claim 29, further including at least one of an ester phthalate and a poly-benzoate.

36. The ink composition of claim 29, wherein the first component is selected from the group consisting of ester phthalates and fluid paraffin.

* * * * *